April 22, 1969 P. J. DELMORE 3,440,091

CONDUCTIVE MAGNETIC TAPE SUPPORT

Filed April 5, 1965

PAUL J. DELMORE
INVENTOR.

BY R. Frank Smith
Thomas W. O'Rourke

ATTORNEYS

United States Patent Office 3,440,091

Patented Apr. 22, 1969

3,440,091

CONDUCTIVE MAGNETIC TAPE SUPPORT

Paul J. Delmore, Rochester, N.Y., assignor to Eastman Kodak Company, Rochester, N.Y., a corporation of New Jersey Filed Apr. 5, 1965, Ser. No. 445,652
Int. Cl. H01b *1/04;* B32b *7/12;* G11b *5/66*
U.S. Cl. 117—216 5 Claims

ABSTRACT OF THE DISCLOSURE

A magnetic recording material is provided wherein a layer containing conductive material is in intimate contact with the surface of the magnetic layer opposite that surface which touches the recording heads; for example, a magnetic material having a magnetic oxide material secured to a flexible support via an adhesive interlayer containing particulate particles of conductive carbon.

Figure 1:
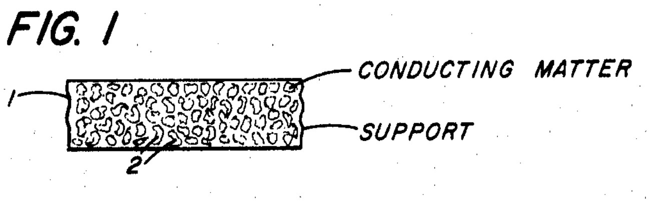

This invention relates to a static-resistant conducting magnetic tape support structure. More particularly, this invention relates to a support structure of polymeric material containing therein particles of electrically conductive matter.

Most polymers employed as pliable supports or films have low conductivity. This low conductivity causes the supports to accumulate static charges. Magnetic tape and phonograph records, for instance, are sensitive to such charges in that objectionable noise is caused by the charge during playback. Also, the static charges often cause the supports to cling together or to other parts of the apparatus. Equally objectionable is the tendency of the static charges to pick up fine particles such as lint and dust. In the case of magnetic tape, the surface accumulation of fine particles not only causes ditsortion during playback but also results in greatly increase wear of the magnetic tape and playback apparatus because of the abrasive action of the fine particles.

Several approaches to the problem of static charges have been put forth in the past. For instance, surfactants have been incorporated in the surface layer or throughout magnetic tape. While this approach diminishes the problem of static charges to a certain extent, it causes another equally serious problem in that the surfactant tends to exude from the material when used in sufficient amounts to effectively curtail undesirable static charges. The exuded surfactant forms objectionable gummy deposits on playback and recording apparatus. Obviously the antistatic protection becomes less effective as the surfactant exudes from the magnetic tape.

Yet another approach involves the inclusion of conducting materials in the magnetic oxide layer of magnetic tape. This straight forward remedy increases the conductivity of the magnetic oxide layer and thereby avoids the accumulation of static charges. However, as is readily apparent, the inclusion of conducting material in the magnetic oxide layer necessarily dilutes the magnetic oxide concentration and thereby deteriorates the quality of playback signal obtainable. Rather widespread acceptance of the detrimental effects of the conductive material in the magnetic oxide layer emphasizes the serious problem caused by static charges on magnetic tapes.

It is an object of this invention to provide a support structure which effectively dissipates objectionable static charges.

Another object of this invention is to provide a support structure to be used in a magnetic tape to dissipate static charges without adversely affecting the quality of the magnetic oxide layer.

Other objects of this invention will be apparent from the following discussion, examples and from the drawing.

It has been determined that objectionable static charges occur when supports having resistivities higher than $10^9$ ohms/sq. are used. According to the instant invention, surface resistivity is kept lower than this value by adding conductive matter in particulate form to the polymeric support. Since, in the case of magnetic tapes, it is generally necessary to provide an adhesive subbing material to enhance adhesion of the magnetic oxide layer to the polymeric support, it is a preferred embodiment of this invention to disperse conductive carbon matter in the subbing layer.

It is surprising that an internal conductive layer adjacent the magnetic oxide layer provides an effective remedy for the problem of static charges since this phenomenon is generally considered a surface effect. In other words, it is surprising that a conductive subbing layer will effectively drain a static charge from the opposite surface of a magnetic oxide layer when the magnetic oxide layer consists primarily of a non-conducting polymeric binder.

Yet another embodiment of this invention concerns the inclusion of particulate conducting matter, such as carbon particles, in the polymeric support material. This embodiment is particularly advantageous when polyethylene terephthalate is the polymeric support material because it not only provides conductivity, which avoids accumulation of static charges, but also lowers the degree to which the polyethylene terephthalate will elongate before breaking. Obviously less elongation enables the tape to be spliced together with less loss of recorded matter.

Conductive matter may be included at the time of polymerization of polymeric support materials. For instance, the conductor can be dispersed in one or more of the monomers employed or dispersed in a low viscosity mixture of the various monomers or prepolymers before forming a film. Similarly, the conductive matter may be incorporated in dopes before casting a film.

The particulate conductive matter may be included in many types of polymeric subbings and/or polymeric support material as will be apparent from the examples below.

While any particulate matter having high conductivity is operable in this invention, carbon particles such as carbon black or graphite are particularly useful in magnetic tape supports in that they afford high conductivity per unit volume and do not substantially affect the magnetic properties of the tape. Other non-magnetic conductive particles are also useful with magnetic tapes.

The invention will be more readily understood with reference to the drawings wherein:

FIG. 1 is an exaggerated cross-sectional view of polymeric support 1 material having dispersed therein particulate conducting matter 2.

Figure 2:
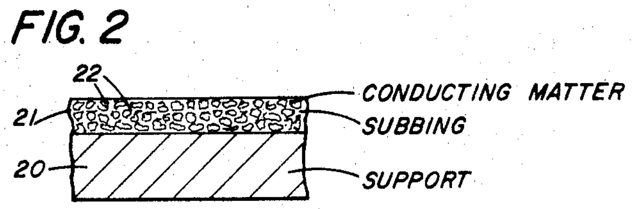
Figure 3:
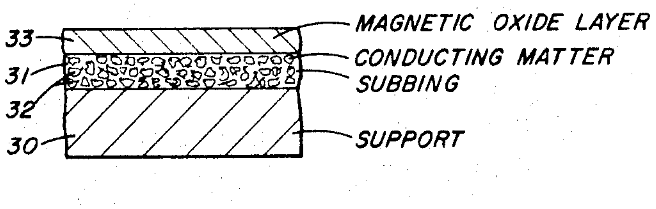

FIG. 2 is an exaggerated cross-sectional view of a polymeric support material 20 having thereon a subbing material 21 with particulate conducting matter 22 dispersed throughout said subbing material, and FIG. 3 is an exaggerated cross-sectional view of a magnetic tape having a polymeric support material 30, a subbing material 31 having particulate conducting matter 32 dispersed therethrough and magnetic oxide layer 33 disposed on said subbing layer 31.

The invention will be more readily understood in view of the following examples which are intended to illustrate the invention but not to limit it.

EXAMPLE 1

350 grams of an adhesive solution containing the condensation product of ethylene glycol, terephthalic acid, isophthalic acid, adipic acid, and sebacic acid prepared in the proportions and according to the method set forth in Example 1 of U.S. Patent 2,892,747 were ball-milled for 7000 minutes with 30 grams of furnace black carbon (Aromex CF), and 15 grams of resorcinol using 3/8-inch steel balls. The solution was then diluted with an equal amount of methylene chloride and applied to a 1 mil polyethylene terephthalate support film to produce a subbing layer between 0.05 and 0.1 mil thickness. The surface resistivity of this subbing layer was $5\times10^5$ ohms/sq. The subbing dissipated static charges through the polyester support, which had a surface resistivity greater than $10^{14}$ ohms/sq., did not.

EXAMPLE 2

25 grams of conductive furnace black carbon (Aromex CF), 375 grams of the adhesive composition used in Example 1 and 20 grams of resorcinol were ball-milled with 3/8-inch steel balls for 2700 minutes. The resulting dispersion was diluted with 420 grams of 1,1,2-trichloroethane. A 0.05 to 0.10 mil thick layer was applied to a 1.0 mil polyethylene terephthalate support and cured. A conventional magnetic oxide layer was applied directly over the conductive layer. The surface resistivity of the thus produced magnetic tape was $1.5\times10^7$ ohms/sq. When tested for static buildup tendencies the magnetic tape was found to be highly resistant to such buildup. A magnetic tape having the same structure and composition except for the omission of the conducting matter displayed objectionable buildup of static charge.

EXAMPLE 3

37 grams of carbon black (Philblack A) and 755 grams of a cellulose acetate dope composition consisting of 10 parts of cellulose triacetate having a 43.5% acetyl content dissolved in 90 parts of methylene chloride solvent were dispersed in a ball-mill for 3000 minutes. This resulting carbon black containing dope composition was cast in a thin layer on a glass surface and, while the thin layer was still wet, a thicker layer of unmodified dope was applied over it. The surface resistivity of the carbon containing side of the cast film was 500 ohms/sq. When a magnetic oxide layer is applied to the triacetate support, no substantial static buildup is observed.

EXAMPLE 4

A triacetate dope such as that set forth in Example 3 except that the carbon black was replaced with a colloidal graphite suspension (DAG 154) was made and a support was cast in the manner set forth in Example 3. The support had a surface resistivity of 6500 ohms/sq. though most of the support was unmodified cellulose triacetate.

EXAMPLE 5

A subbing material consisting of 375 parts of the adhesive composition in Example 1, 125 parts of furnace black carbon (Aromex CF), 75 parts of resorcinol and 1500 parts of a mixture of 1,1,2-trichloroethane and methylene chloride was produced by ball-milling and applied to a 1 mil polyethylene terephthalate support. A conventional magnetic oxide layer was applied to the cured subbing and slit into magnetic tape. No static problem was encountered with this product because of a greatly reduced tendency for the tape to acquire a charge and a substantial reduction in the amount of charge the tape would sustain.

Summarily, this invention is concerned with the reduction and dispersion of static charges by incorporating conducting materials into layers other than the critical layers. For instance, with regard to magnetic tape, the problem concerns the elimination of static charges on the magnetic oxide layer. This is accomplished by incorporating conducting materials into the support of the magnetic oxide layer and is effective despite the fact that the magnetic oxide layer itself is substantially nonconductive. The conducting materials and particularly carbon conducting materials do not adversely affect the usual desirable properties of the sub support. Thus the subbing layer effectively promotes adhesion of the magnetic oxide layer to the film support layer despite the inclusion of a sufficient amount of conducting material to lower the surface resistivity of the subbing layer to below $10^9$ ohms/sq.

When subbing layers are not used, such as in cellulose triacetate supports, the cellulose support can be cast with a thin portion thereof containing the conducting matter. This enables the support to be rendered sufficiently conductive to avoid static charge complications but does not effectively change the other physical properties of the support since the bulk of the support is cast from unmodified cellulose triacetate.

Polyethylene terephthalate or other polyester supports can be rendered conductive by incorporating the conductive material in the reacting monomeric or low viscosity polymeric solutions when forming the support material. While the physical properties of the polyester are altered somewhat by this approach, the support is in many ways superior because the alteration produces a low surface resistivity and a low elongation before breaking. Thus the instant invention affords a convenient solution to the static electricity problems while not adversely altering the quality of the magnetic oxide layer and, in many cases, not substantially affecting the properties of the layers in which the conducting matter is incorporated.

The invention has been described in detail with particular reference to preferred embodiments thereof, but it will be understood that variations and modifications can be effected within the spirit and scope of the invention as described hereinabove and as defined in the appended claims.

I claim:

1. In a magnetic recording material having a flexible polymeric suport film, a continuous layer comprising magnetic oxide coated thereover and an adhesive interlayer securing said magnetic oxide layer to said support, the improvement wherein said adhesive layer having a thickness less than about 0.1 mil is in intimate contact with said magnetic oxide layer and said adhesive layer contains electrically conductive particulate matter uniformly dispersed therein.

2. The invention according to claim 1 and wherein said electrically conductive particulate matter comprises carbon particles.

3. The invention according to claim 2 and wherein said flexible film is a polyester composition.

4. The invention according to claim 3 and wherein said polyester is polyethylene terephthalate.

5. The invention according to claim 1 and wherein the polymeric support film is a cellulose material.

References Cited

UNITED STATES PATENTS

| | | | |
|---|---|---|---|
| 2,819,186 | 1/1958 | Franck. | |
| 2,825,558 | 3/1958 | Devaud. | |
| 2,997,451 | 8/1961 | Miller | 260—41 X |
| 3,007,892 | 11/1961 | Gruschke et al. | 260—40 |
| 3,235,772 | 2/1966 | Gurin | 317—2 |
| 3,293,066 | 12/1966 | Haines | 117—226 X |

EARL M. BERGERT, *Primary Examiner.*

R. A. KILLWORTH, *Assistant Examiner.*

U.S. Cl. X.R.

161—231; 317—2; 274—43; 117—218, 239